(12) United States Patent
Miller et al.

(10) Patent No.: US 7,079,812 B2
(45) Date of Patent: Jul. 18, 2006

(54) SYSTEMS AND METHODS FOR INTERFERENCE MITIGATION WITH RESPECT TO PERIODIC INTERFERERS IN SHORT-RANGE WIRELESS APPLICATIONS

(75) Inventors: Karl A. Miller, Frederick, MD (US); David S. Kloper, Mt. Airy, MD (US); Neil R. Diener, Rockville, MD (US)

(73) Assignee: Cognio, Inc., Germantown, MD (US)

( * ) Notice: Subject to any disclaimer, the term of this patent is extended or adjusted under 35 U.S.C. 154(b) by 761 days.

(21) Appl. No.: 10/248,434

(22) Filed: Jan. 20, 2003

(65) Prior Publication Data

US 2004/0203474 A1    Oct. 14, 2004

Related U.S. Application Data

(60) Provisional application No. 60/380,890, filed on May 16, 2002, provisional application No. 60/319,435, filed on Jul. 30, 2002, provisional application No. 60/319,599, filed on Oct. 7, 2002.

(51) Int. Cl.
*H04B 1/00* (2006.01)
*H04B 15/00* (2006.01)

(52) U.S. Cl. .................. 455/63.1; 455/67.11; 455/501; 455/502; 455/41.2; 455/69; 455/67.13; 375/132; 375/134; 375/137; 370/342; 370/395.42

(58) Field of Classification Search ............... 455/41.2, 455/69, 63.1, 67.11, 67.13, 501; 375/130, 375/134, 132; 340/572.1, 10.33, 448; 370/342, 370/395.42
See application file for complete search history.

(56) References Cited
U.S. PATENT DOCUMENTS

| | | | |
|---|---|---|---|
| 5,574,979 A | * 11/1996 | West | 455/63.1 |
| 6,256,478 B1 | * 7/2001 | Allen et al. | 455/63.1 |
| 6,349,198 B1 | * 2/2002 | Carlson et al. | 455/63.1 |
| 6,374,082 B1 | * 4/2002 | Carlson | 455/63.1 |
| 6,377,608 B1 | * 4/2002 | Zyren | 375/132 |
| 6,549,784 B1 | * 4/2003 | Kostic et al. | 455/501 |
| 6,711,122 B1 | * 3/2004 | Langley et al. | 370/205 |
| 6,892,054 B1 | * 5/2005 | Belcher et al. | 455/63.1 |
| 6,954,616 B1 | * 10/2005 | Liang et al. | 455/63.1 |

* cited by examiner

*Primary Examiner*—Marceau Milord
(74) *Attorney, Agent, or Firm*—Edell, Shapiro & Finnan, LLC

(57) ABSTRACT

Several techniques are provided for use by wireless devices to avoid interference with signals that are of a periodic or quasi-periodic nature that may operate in the same frequency band and proximity. In some cases, the periodic signals are detected and their timing is determined so as to predict when a next interfering event will occur. Devices that are affected by the periodic signal (such as an affected device with information to be transmitted or devices that have information to be transmitted to the affected device) are controlled to prevent transmissions during the interfering intervals. In addition, a process is provided to dynamically fragment a transmit frame of information to transmit part of the information before the interfering interval and the remainder of the information after the interfering interval, rather than waiting to transmit the entire frame until after the interfering interval. Moreover, techniques are provided to correct for clock drift between the periodic signal and a device affected by the periodic signal, as well as for clock drift between a device affected by the periodic signal and other devices that communicate with that device. These techniques prevent interference with periodic signals and in so doing, improve the quality of service of the communication link for both the interfering devices and the other devices.

54 Claims, 9 Drawing Sheets

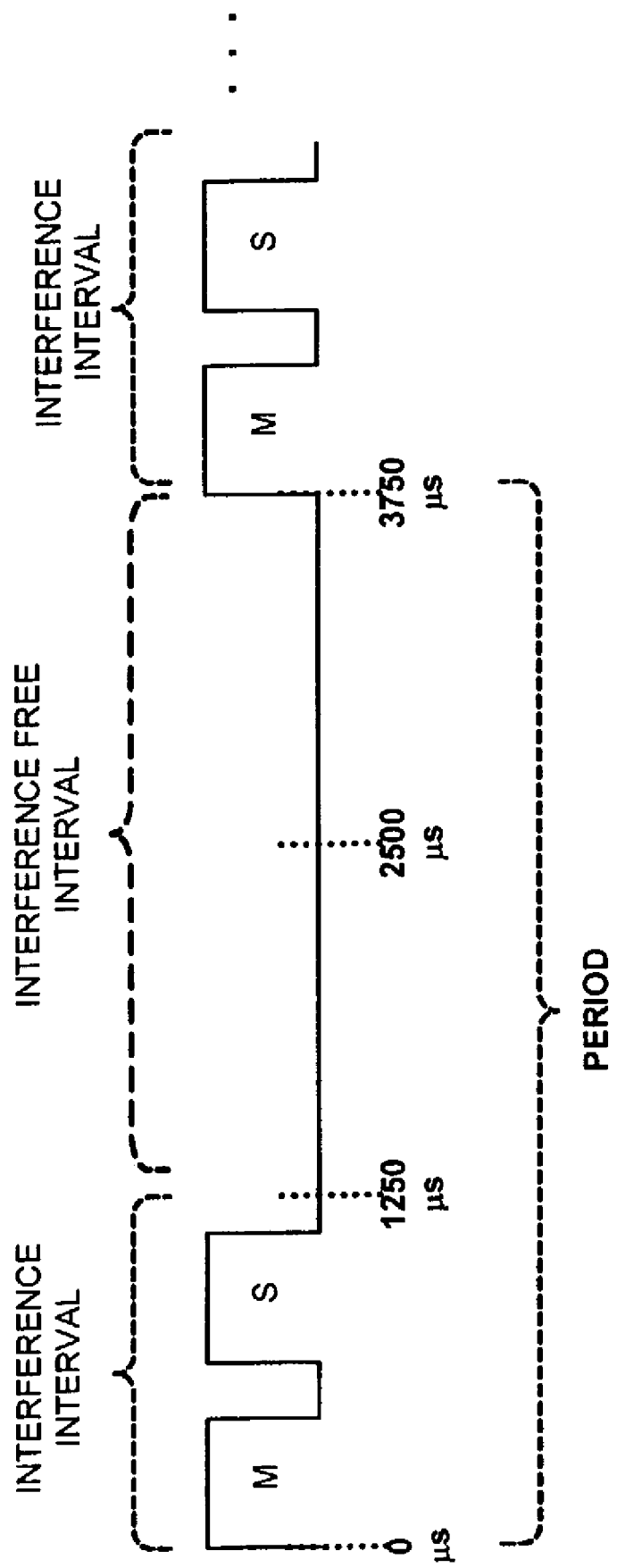

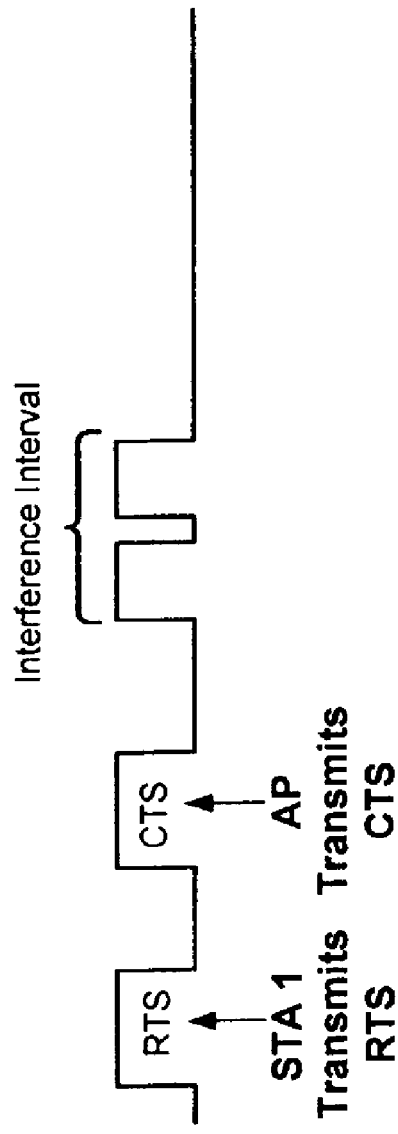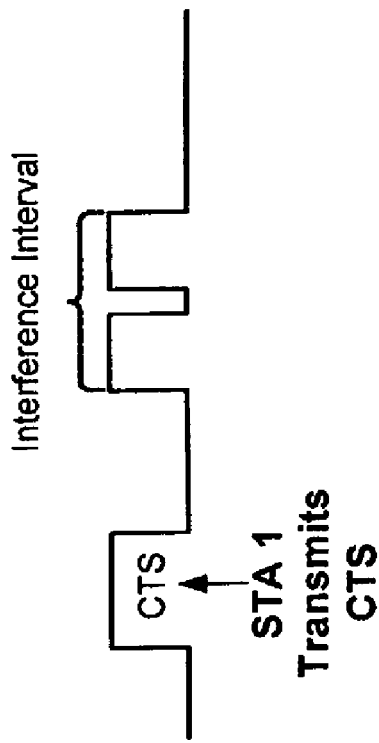

200

SYSTEMS AND METHODS FOR INTERFERENCE MITIGATION WITH RESPECT TO PERIODIC INTERFERERS IN SHORT-RANGE WIRELESS APPLICATIONS

CROSS REFERENCE TO RELATED APPLICATIONS

This application claims priority to the following U.S. Provisional Patent Applications: U.S. Provisional Application No. 60/319,599, filed Oct. 7, 2002; U.S. Provisional Application No. 60/380,890, filed May 16, 2002; and U.S. Provisional Application No. 60/319,435, filed Jul. 30, 2002. The entirety of each of the aforementioned provisional applications is incorporated herein by reference.

BACKGROUND OF INVENTION

The present invention is directed to short-range wireless communication applications, and more particularly, to techniques to prevent interference between communication devices and other devices that create periodic or quasi-periodic interference with them.

In wireless networks, particular short-range wireless networks such as wireless local area networks (WLANs), the radio frequency band that the wireless network uses is often a frequency band that is shared with other wireless applications. For example, an IEEE 802.11 WLAN operates in either the 2.4 GHz unlicensed band or one of the 5 GHz unlicensed bands in the U.S. Other non-IEEE WLAN devices operate in these frequency bands, including devices that operate in accordance with the Bluetooth™ protocol, cordless telephones, microwave ovens, infant monitors, radar, etc. Some of the non-WLAN devices that operate in these unlicensed bands transmit on a periodic or quasi-periodic basis, and their transmissions can interfere with operation of WLAN devices. When transmissions of WLAN devices at least partially overlap with the transmissions of the non-WLAN devices, the WLAN device may suffer complete loss of signal, or at the least reduced signal quality and/or throughput. Likewise, the non-WLAN devices may suffer similar problems.

Accordingly, a mechanism is needed to allow for cooperative operation of WLAN devices with non-WLAN devices so that throughput of both WLAN and non-WLAN communication is not significantly degraded.

SUMMARY OF INVENTION

Briefly, several techniques are provided for use by wireless devices to avoid interference with signals that are of a periodic or quasi-periodic nature that may operate in the same frequency band and proximity. In some cases, the periodic signals are detected and their timing is determined so as to predict when a next interfering event will occur. Devices that are affected by the periodic signal (such as an affected device with information to be transmitted or devices that have information to be transmitted to the affected device) are controlled to prevent transmissions during the interfering intervals. In addition, a process is provided to dynamically fragment a transmit frame of information to transmit part of the information before the interfering interval and the remainder of the information after the interfering interval, rather than waiting to transmit the entire frame until after the interfering interval. Moreover, techniques are provided to correct for clock drift between the periodic signal and a device affected by the periodic signal, as well as for clock drift between a device affected by the periodic signal and other devices that communicate with that device. These techniques prevent interference with periodic signals and in so doing, improve the quality of service of the communication link for both the interfering devices and the other devices.

The above and other objects and advantages of the invention will become more readily apparent when reference is made to the following description taken in conjunction with the accompanying drawings.

BRIEF DESCRIPTION OF DRAWINGS

FIG. 2 is a timing diagram of an exemplary interfering signal.

FIGS. 3A and 3B are timing diagrams illustrating techniques to avoid interference with the interfering signal.

DETAILED DESCRIPTION

Figure 1:
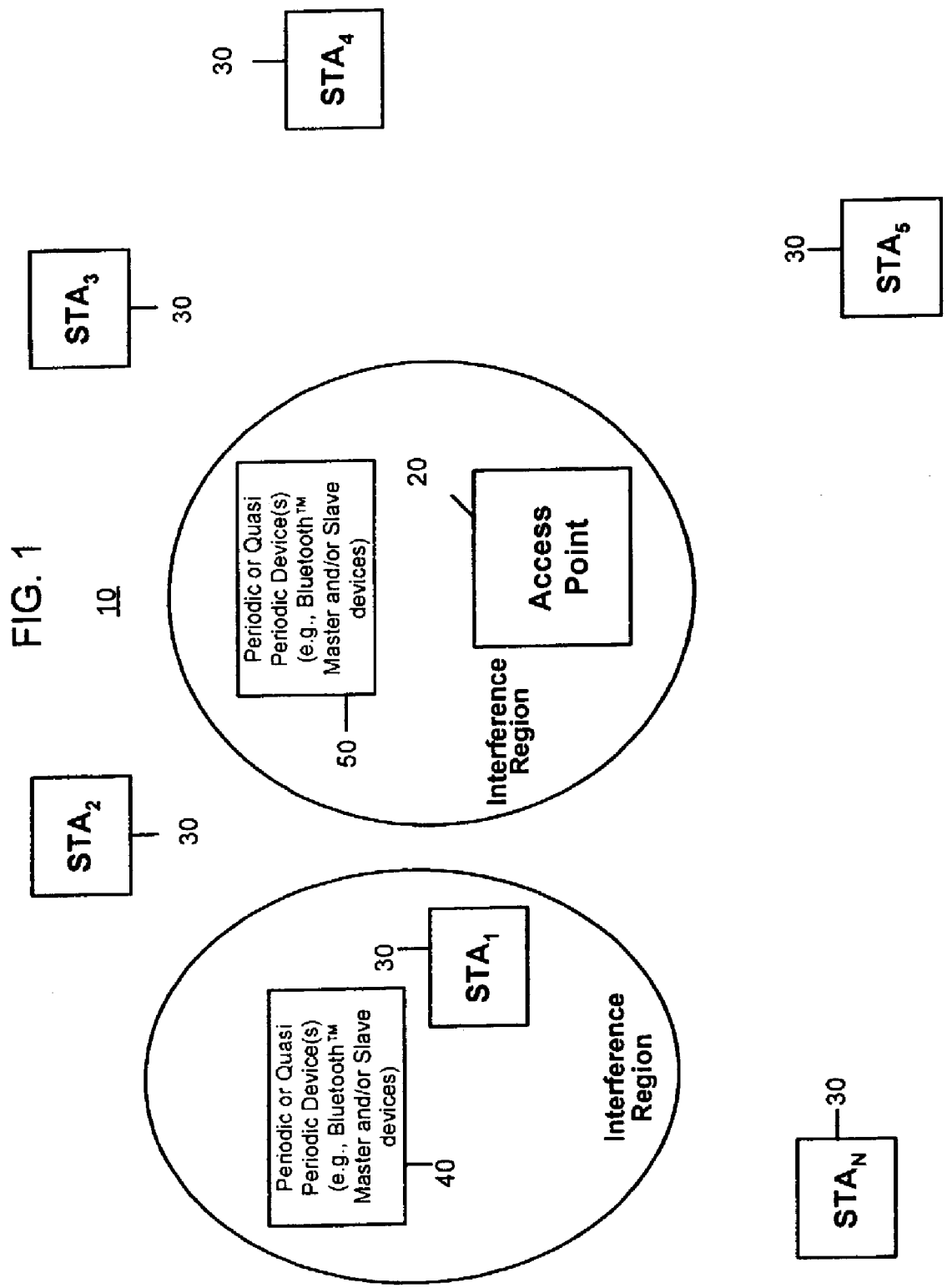
FIG. 1 is a block diagram illustrating interference situations in a wireless local area network (WLAN).

FIG. 1 shows an example of a short-range wireless network environment having a fixed terminal and a plurality of remote terminals. An example of such a network is an IEEE 802.11x wireless local area network (WLAN) 10 comprising an access point (AP) 20 and several associated stations (STAs) 30, identified as $STA_1$ through $STA_N$. If the WLAN is operating in an environment where other non-WLAN devices are operating, then those devices may interfere with operation of the WLAN. An example of a potentially interfering device that transmits on a periodic or quasi-periodic basis is a Bluetooth™ device (e.g., a Bluetooth™ headset), a cordless telephone device, radar, microwave oven, etc. The WLAN and the other devices may be operating in an unlicensed frequency band, such as the 2.4 GHz band or one of the 5 GHz bands in the U.S. In FIG. 1, interfering devices are shown at reference numerals 40 and 50, respectively.

The exemplary interfering devices transmit periodically or quasi-periodically. Moreover, a Bluetooth™ device hops to different frequencies. The interfering device may affect WLAN operation in a variety of ways.

For example, due to its location and other factors, interfering device 40 may interfere with only one station, such as $STA_1$, but not any other device in the WLAN 10. This may be a very common scenario because the range of a Bluetooth™ headset device, for example, is minimal compared to the possible locations of other STAs in the WLAN 10. On the other hand, another interfering device 50 may interfere only with the AP 20, but not directly with any one of the STAs. It is also possible than an interfering device may cause interference at the AP 20 and at one or more or all of the STAs 30. Of course, when the AP 20 is interfered with, the entire wireless network is affected.

The term "quasi-periodic" is meant to include a signal that is for some periods of time, periodic in nature, and during other periods of time, aperiodic, as well as signals that are not precisely periodic, but their repetitive occurrence can be predicted within tolerances that are sufficient for scheduling other signals so as to avoid colliding with them. For example, if a frequency hopping signal hops across a broad frequency band, but a communication device can observe only part of that frequency band, then even if the frequency hopping signal is periodic, that communication device will not observe it to be periodic.

FIG. 2 shows the timing of a periodic interfering signal, such as a BT synchronous (SCO) transmission which consists of a transmission by a master (M) BT device very closely followed by a transmission by a slave (S) BT device. The interference interval of both of these signals is 1250 microsec and the period (1 divided by the frequency of its occurrence) of this interferer is 3750 microsec. That is, these two signals are present every 3750 microsec and lasts for approximately 1250 microsec. It is possible that only the master BT signal or only the slave BT signal may be interfering with a STA or AP, or both may be close enough to the STA or AP so that both transmissions interfere with it. The following description assumes that both the master and slave transmissions are strong enough or close enough to the STA or AP so as to interfere with it, but it should be understood that the following interference avoidance techniques are similarly useful if only one of these signals interferes with the STA or AP. In the latter case, the actual interference interval will be shorter.

FIG. 3A shows one technique to mitigate this interference scenario. $STA_1$ transmits a request-to-send (RTS) frame prior to the BT interference interval. The RTS frame includes an 802.11 network allocation vector (NAV) "duration" sufficient to inform the AP to defer transmissions to it for a time period corresponding to an interference interval of the interfering signal wireless signal. $STA_1$ does not transmit during the interference interval. The AP will receive the RTS and send a clear-to-send (CTS) packet that will inform any device that receives the CTS to defer transmission to that STA for a time period corresponding to the interference interval of the interfering wireless signal.

This mechanism works with any type of AP. However, it requires 267 RTS/CTS exchanges per second, and it prevents any 802.11 STA which hears the RTS/CTS from transmitting during the NAV interval, thus causing reduction of BSS bandwidth by more than 30%. Therefore, while it is a suitable technique for an environment with one AP and one or a few number of STAs, it is not as practical for a network that has numerous STAs demanding access to the network, such as an enterprise network.

It can be further improved by doing a straight transmission of a CTS. In FIG. 3B, a mechanism is shown in the affected STA, e.g., $STA_1$, sends just a CTS packet addressed to itself, rather than sending an RTS and awaiting the CTS reply as shown in FIG. 3A. When the STA sends the CTS, it indicates in the NAV field of the CTS the appropriate time period to advise other devices in the network to avoid or defer transmitting during the interference interval.

The advantage of the techniques shown in FIGS. 3A and 3B is that the other devices that receive the RTS or CTS signals do not need to have any understanding about the periodic or quasi-periodic signal that is causing the interference. Rather, these devices merely respond to the information in the RTS or CTS, and in so doing, avoid interfering with that signal.

Figure 4:
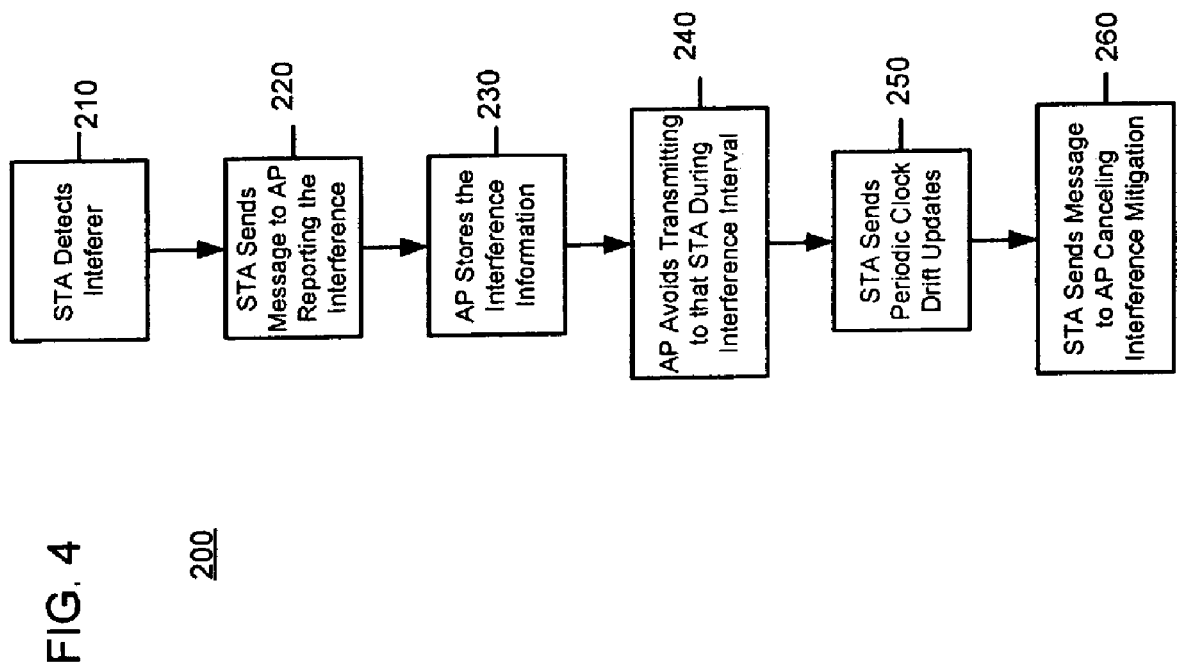
FIG. 4 is a flow chart of another interference avoidance technique.

With reference to FIG. 4, a second process 200 that is more suited for an enterprise network is provided. According to this technique, when the STA recognizes periodic interference in step 210, it reports in a wireless message transmitted to the AP information about the interference including the start time, time duration of the interference interval during which the interfering wireless signal is present, and the period of occurrence of the interfering wireless signal in step 220. In step 230, the AP stores the interference related information received from that STA. In step 240, using that information, the AP schedules transmission to that STA to avoid transmitting during the interference interval. The STA transmits periodic updates to compensate for clock drift in step 250. A further discussion of clock drift issues and techniques to deal with them is provided hereinafter. When the interference terminates, in step 260, the STA sends a message to the AP to cancel the interference mitigation.

This technique does not impact the STAs which do not hear the interference. Only the "impaired" STA loses some access time to the network. In addition, it generates minimal air-time traffic because an update message is sent approximately every 2–4 seconds, or as infrequently as every 30 seconds. Therefore, this technique is appropriate for an enterprise environment.

Another alternative that can be used by a STA to avoid interfering with a local interferer, such as Bluetooth, is to suppress transmission of a response signal that it would otherwise transmit in response to a signal it receives from another device if that responsive signal would normally be scheduled for transmission during an expected interference time window. For example, a STA will typically respond to a RTS packet with a CTS packet, and will respond to a data frame from the AP or a STA with an ACK packet. If the traffic to this single STA is relatively low, this technique requires much less overhead than reserving a third of the channel bandwidth plus any CTS traffic and guard windows and is interoperable with any existing IEEE 802.11x implementation. The interfering device is much more likely to suffer from interference from a local STA's transmissions, then from a colliding 802.11 frame from a device much further away. If the traffic to the STA is relatively light, then the occasional cases when the CTS or ACK is suppressed would be automatically recovered by the normal MAC level retransmissions with much less overhead.

Detecting and Reporting on an Interferer

Figure 5:
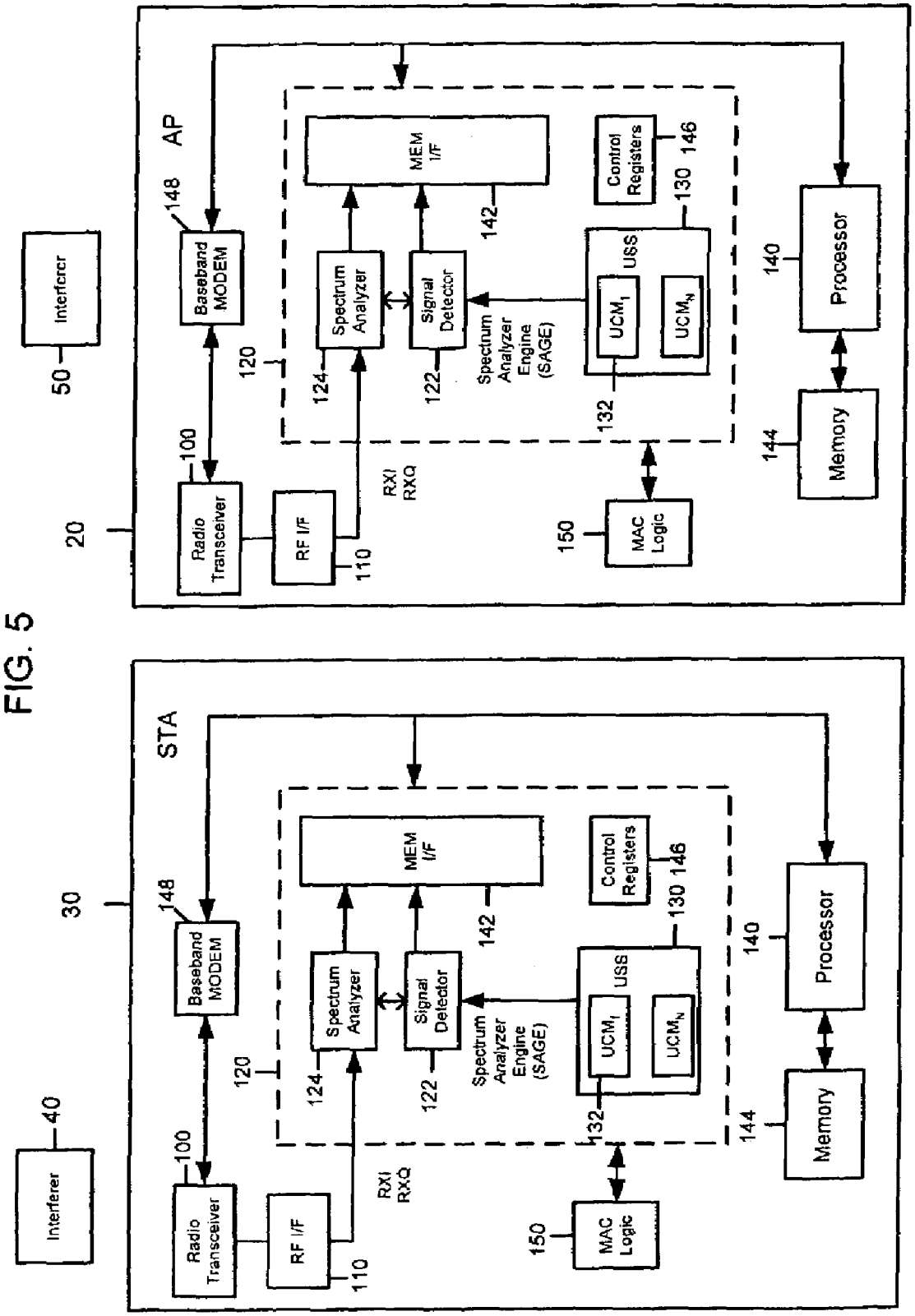
FIG. 5 is a block diagram of a station and an access point, and particularly showing components useful in the interference mitigation process of FIG. 4.

FIG. 5 illustrates an exemplary AP 20 and STA 30. Each of these devices comprises, among other components, a radio transceiver 100 and a radio interface 110 and certain components and functionality to detect and track interferers. The capability to generate interference information is provided, for example, by way of a hardware peripheral included in both the STA and the AP. This peripheral is called a spectrum analysis engine (SAGE) shown at 120 and it contains a signal detector 122 to detect signal pulses of various types, a spectrum analyzer 124 to obtain spectral information of activity in the frequency band, and a universal signal synchronizer (USS) 130 that synchronizes to a clock of a signal detected by the signal detector 122, such as the signal sent by an interferer. The output of the signal detector 122 includes pulse event information describing each detected pulse by pulse bandwidth, pulse duration, pulse center frequency, etc. The USS 130 comprises a plurality of universal clock modules (UCMs) 132 that are assigned to track each periodic interferer that is detected by the AP 20 or STA 30. The SAGE peripheral and the USS component are disclosed and described in U.S. patent application Ser. No. 10/246,365, filed Sep. 10, 2002, the entirety of which is incorporated herein by reference. Control and information are exchanged between the SAGE 120 and processor 140 via a memory interface (MEM I/F) 142. The processor 140 in the STA and in the AP executes instructions encoded or stored in the memory 144 to perform steps of the process shown in FIG. 4. The processor 140 also configures the SAGE 120 using control registers 146. The processor 140 may be a processor that resides on the same chip where with the digital logic that executes a baseband modem 148 and SAGE 120 processes reside, or may be a hosted processor.

The processor 140 can detect interference from a periodic signal source such as a Bluetooth™ headset, a cordless phone, etc., by examining traffic statistics gathered by the host communication device. For example, medium access control (MAC) logic 150 may accumulate traffic statistics indicating how successful the device has been in transmitting to and receiving information from other devices according to a MAC protocol, such as an IEEE 802.11x protocol, employed by the device. Traffic statistics that may reveal the presence of an interferer are: (1) unexpectedly high packet errors (2) un-acknowledged messages; (2) repeated cyclic redundancy code (CRC) errors; (3) low received signal strength, etc. The degree of deviations from normal levels in any one or more of these statistics would be dependent on a specific wireless application.

When the processor 140 determines to look for the cause of the interference, it examines the output of the signal detector 122 to generally detect the nature of the signal (step 210 in FIG. 4) and confirm that it is a periodic or quasi-periodic signal. It configures the appropriate frequency and phase parameters corresponding to the interference source into a UCM 132, and, using pulse timing information from the signal detector 122, phase/frequency locks the UCM timing to the transmit timing of the interference source. After phase/frequency lock has taken place, the UCM can be used as a timing reference to prevent data transmissions to/from the MAC logic 150 from overlapping and interfering with the interference source.

The USS 400 passes UCM timing information to an external component, such as the MAC logic 150, using the signals that include information as to the next interference duration and the time of the next interference signal, based on activity tracked by one or more UCMs.

The functionality of the USS 130 may alternatively be implemented by software instructions stored in the memory 144 and executed by the processor 140 in the STA or AP. For example, the processor 140 generates a list (stored in memory 144) of upcoming interference events, including their start time and time duration When the STA detects an interferer, the processor 140 assigns a UCM 132 in the USS 130 to track the clock/timing of the interferer. As represented by the flow chart in FIG. 4, the processor 140 will also generate the appropriate messages that the STA transmits to the AP to advise the AP about the interference. Likewise, when the AP receives an interference alert message from the STA, the processor in the AP assigns a UCM in its SAGE peripheral to keep track of the interference alert information received from the STA. The processor in the AP also controls the scheduling of transmissions to that STA, as well as generation of other messages to other STAs in the WLAN, depending on the type of interference experienced. It is possible that the AP may track multiple different interferers from different or the same STAs, and that any given STA may track multiple different interferers.

Clock Drift Issues

Figure 6:
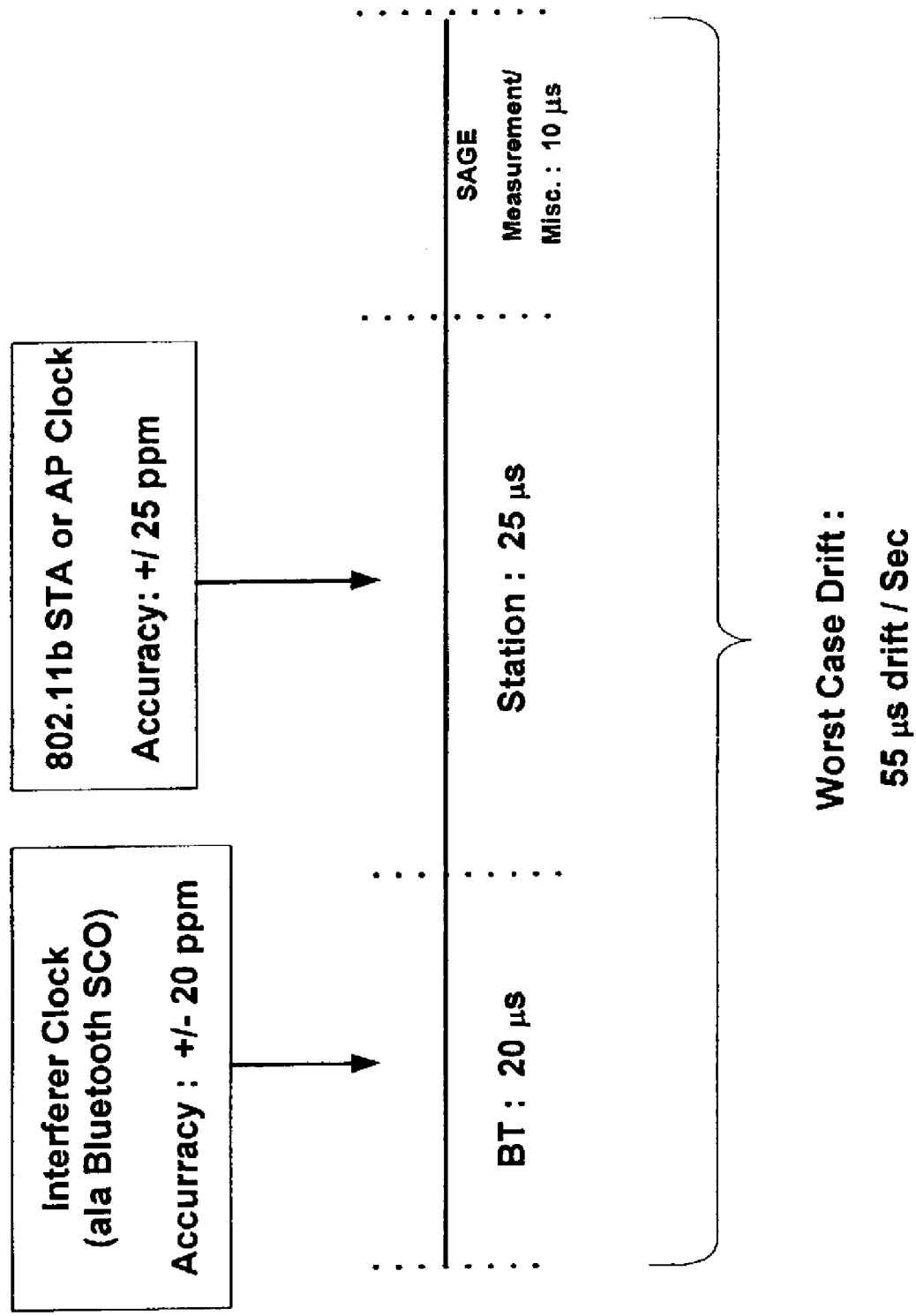
FIG. 6 is a diagram illustrating a problem of clock drift between devices in the WLAN.
Figure 7:
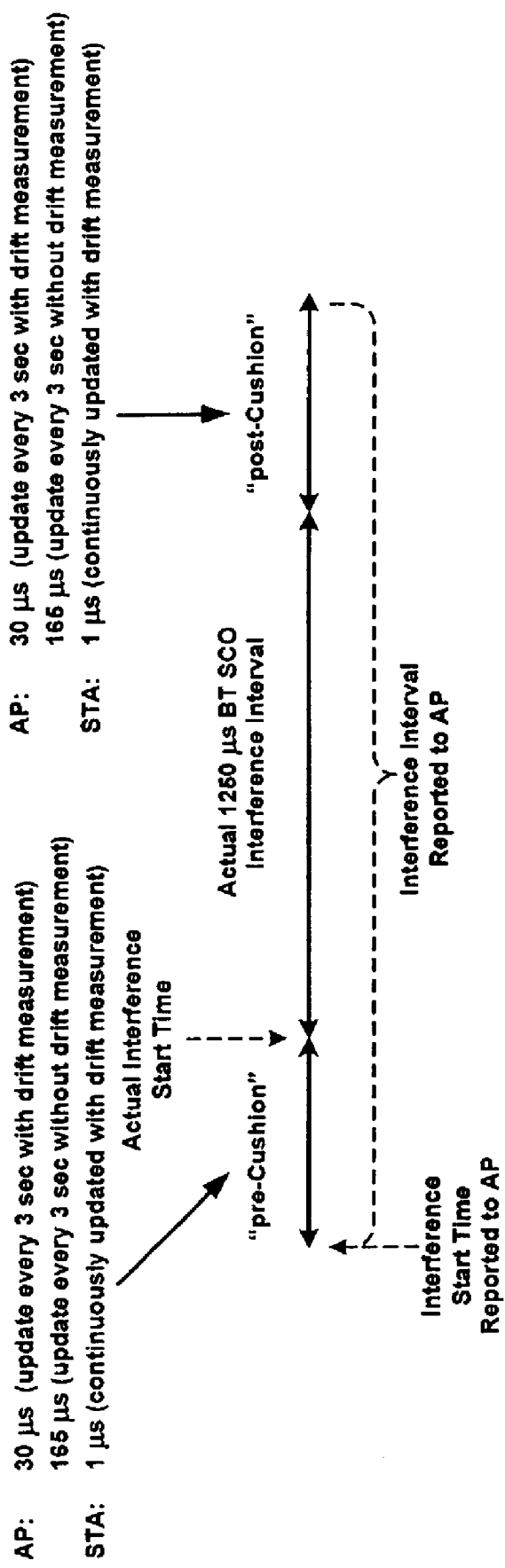
FIG. 7 is a timing diagram illustrating an interference cushion technique used to deal with clock drift.
Figure 8:
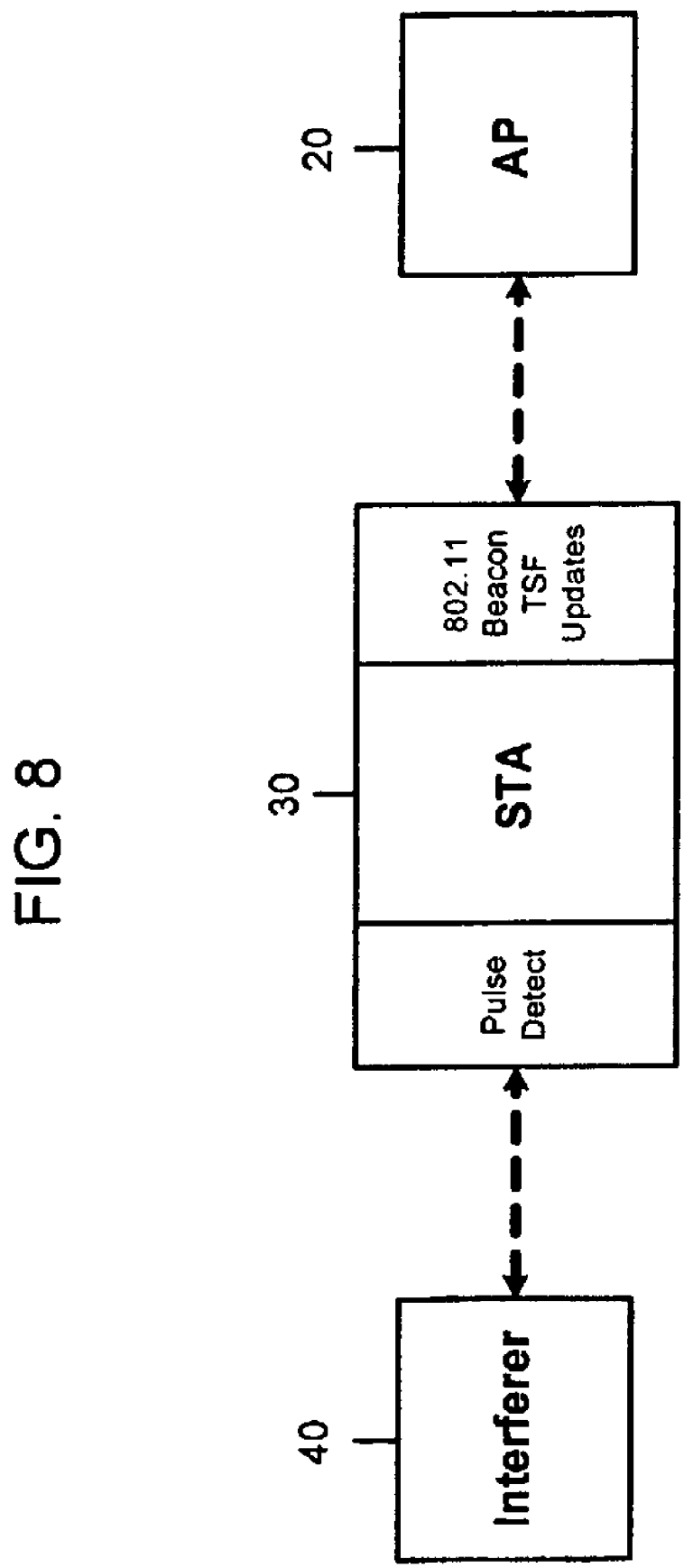
FIG. 8 is a block diagram illustrating another technique to deal with clock drift.

Reference is made to FIGS. 6–8 for describing how drifts in the clocks between the interferer, STA and AP are addressed. In some situations, the interferer clock may drift relative to a clock of the impaired STA, and the STA clock may drift relative to a clock in the AP. This situation is shown in FIG. 6. To provide protection from clock drifts, the STA may add an interference "cushion" to the beginning and end of the interference interval to prevent transmissions to it for an extended period of time as shown in FIG. 7. Alternatively, the AP may add the interference "cushions" to the interference interval based on clock drift information received from the STA. That is, correction for the clock drift may be done at the device the measured the drift, or another device that receives information about the drift.

The STA may detect a clock drift with respect to the interferer using the USS modules as described above. The STA may detect clock drift between it and the AP using the preamble of a signal frame containing a time reference, such as an IEEE 802.11 preamble for a Beacon frame.

The STA evaluates the drift between it and the interferer and the drift between it and the AP to determine when the cushion is no longer sufficient to ensure interference mitigation. When this occurs the STA sends an update to the AP indicating the latest estimate of start time, interference duration, and interference period. Even if the drift is within bounds, the STA will provide periodic "drift updates" as a form of "keep alive" for the AP interference mitigation.

In some situations, the interference cushion could become large. Rather than having a large cushion around the nominal interference times, so as to allow for clock drift, there are several steps that can be performed that can significantly reduce this drift, and can also be used to reduce the frequency at which updates will need to be propagated to a peer that must also remain synchronized. As shown in FIG. 7, if the clock drift between devices is continuously measured and adjusted, a smaller cushion can be used for a given interferer update frequency. Otherwise, a larger cushion value would be used at a given interferer update frequency. For example, if drift measurements are not made, and an update message is sent every 3 seconds about the interferer, then the worse case cushion is 165 microsec on both ends of the interference interval. However, if drift measurements are made, this cushion can be made much smaller, such as 30 microsec at each end of the interference interval. Other techniques for measuring clock drifts are described hereinafter. For discussion purposes, the example used is of an 802.11b STA that is trying to synchronize with Bluetooth SCO traffic, and will also synchronize this timing with its' AP that is not able to hear the Bluetooth traffic.

With reference to FIG. 8, in an 802.11 network, the AP will regularly transmit a Beacon frame that the STA is expected to receive. This frame includes a 64 bit TSF (Timing Synchronization Function), which is a timestamp of 1 μs granularity, and must be synchronized to within +/−4 μs. The STAs use the Beacon timer to update their local time. The difference between the two times can be used to determine the AP-STA clock drift. This clock synchronization with the AP can be performed prior to detection of any interfering device, so it will not impact the response time when an interference source begins.

The nominal interval for the Bluetooth™ SCO interferer traffic consists of a transmit frame and a receive frame being sent at 3750 μs intervals. The actual interval will vary based on the local reference oscillator used by the 2 Bluetooth devices, and would be further perceived to vary based on the oscillator at the STA. If all oscillators had an accuracy of +/−20 ppm, this would account for an error of up to 40 μs per second. A more accurate method would instead use the actual measured interval, and would further refine this value over time. For example, this is based on a 0.5 μs (2 MHz) timestamp, and an error of no more than +/−1.0 μs per interval, or 267 μs per second, should be experienced. This initial coarse estimate can be further refined by comparing the actual measurement samples to the expected value over a longer time period. This error term can be used to add or drop a clock from some intervals to factor out this additive measurement error. Thus, after monitoring the intervals for 1 second, it is possible to extrapolate future occurrences to an accuracy of +/−1.0 μs per second, or 1 ppm.

At first it may appear that this process could be continued ad infinitum to improve on the interval estimate to achieve increased accuracy, but in fact this is not possible as the oscillators can be expected to vary over time and temperature. The oscillators will eventually drift primarily due to temperature changes. A good rule of thumb to use for estimating the drift rate in this case is ½ microsecond per second. For example, one assumption is a TCXO with +/−20 ppm of variation over 70 degrees C. (4/7 ppm per degree C.), and 3 degrees F.=1.7 degrees C. temperature variation over 5 minutes (due to air conditioner hysteresis, etc.).

When the interference first starts, the samples that are used to determine this is in fact a periodic (or quasi-periodic) interference source can also be used to initialize the phase and interval to the best accuracy that is currently available. This allows starting the interference avoidance techniques sooner, so as to minimize impact on either networks' traffic, but initially requiring a larger cushion value. As additional samples come in, they can be used to adjust the phase of the interference as well as to increase the accuracy of the interval (and decrease the cushion) up to the expected limit of 1 ppm.

When the 802.11 STA has achieved synchronization with both the interferer traffic and the AP, it can easily convert the interval and phase from its local reference to the AP''' TSF timing (which is locked to its USS timing). Once accomplished, this information can be transmitted to the AP, and the AP would be able to use this information to synchronize its USS to track the interference. The updates need only be sent when the cumulative drift since the last update exceeds some desired cushion size, or a minimum update interval for session keep-alive purposes. A larger cushion may be required on the AP side, due to the less frequent update mechanism. To help isolate the AP from the current cushion size (based on remote synchronization, and parameters that affect update frequency), it is expected that the STA would include the cushion in any specified interference definition that is provided to the AP.

These clock drift correction techniques may be used in combination with any of the other interference management techniques described herein. Moreover, a single device, affected by a periodic interferer, may detect clock drift between it and the periodic signal, and correct for the clock drift itself using the techniques described in the foregoing.

The AP Experiences Local Interference

With reference again to FIG. 1, when an AP 20 is experiencing local interference, the AP 20 wants to ensure that the STAs 30 do not transmit to it during the interference interval. In fact, when the AP 20 is interfered with, the entire WLAN 10 is affected. In this case, the AP 20 will assign a UCM 132 in the USS 130 to track the interferer, and it will broadcast an interference message including start time, interference interval, and interference period to all the STAs 30. The AP 20 will continue to send interference "drift updates" to the STAs 30, in much the same manner that the STA provides updates to the AP as described above. Alternatively, the AP may use the previously described RTS/CTS approach.

Global Interference

Again, with reference to FIG. 1, if the STAs 30 and the AP 20 all hear a common interference (which is not specifically shown in FIG. 1 to simplify the figure), the STAs 30 will initially report the interference to the AP 20. The AP 20 will notify the STAs 30 via a broadcast message indicating that this is a common interference source with a given start time, interference interval, and interference period. Since the STAs 30 and AP 20 all hear the interference, drift updates are not necessary. The STAs 30 and AP 20 will announce when the interference is no longer seen. STA/AP periodic updates will indicate that the interference is still ongoing.

Other Examples of Interference Avoidance Action

Figure 9:
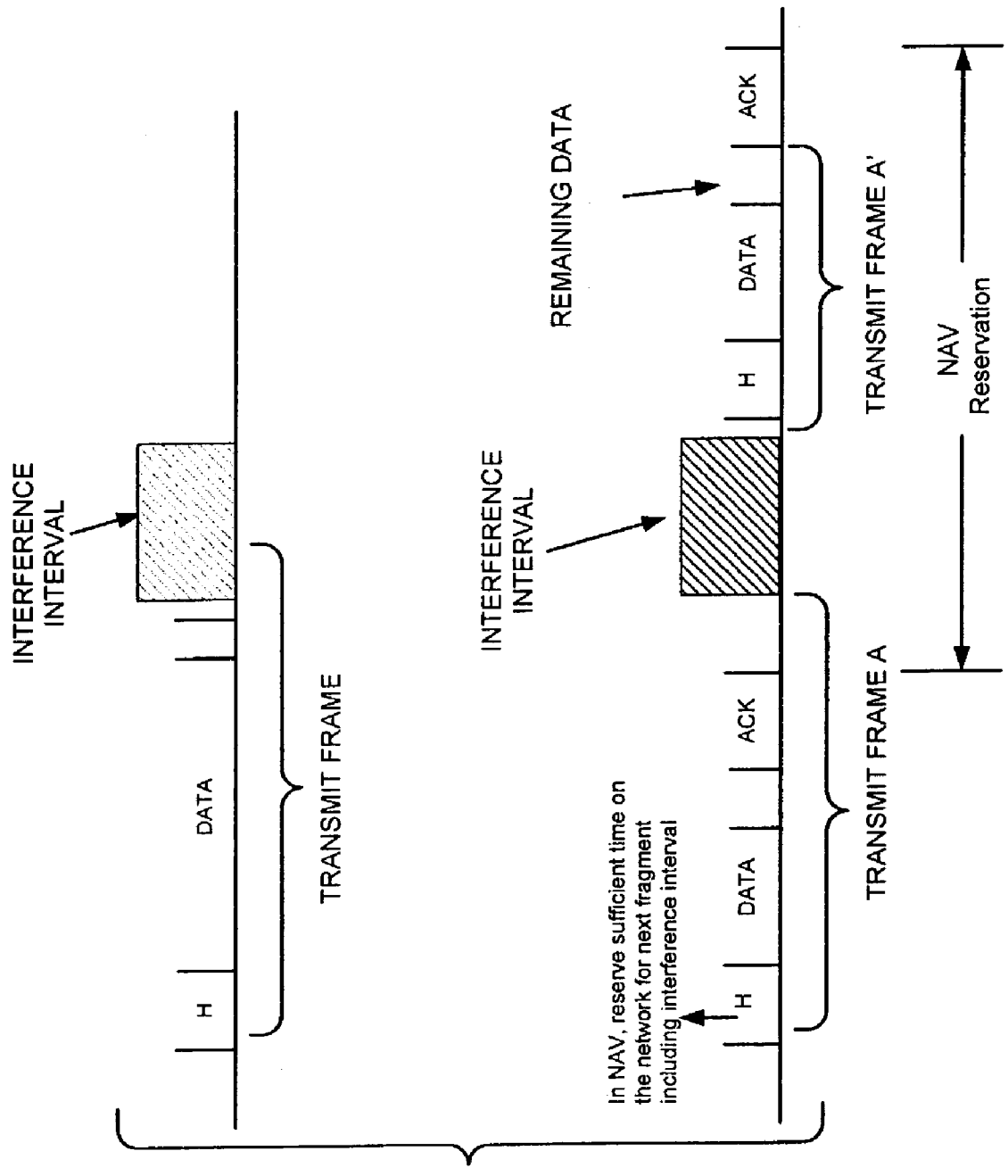
FIG. 9 shows timing diagrams that illustrate a dynamic fragmenting interference avoidance technique that makes best use of air time.

Described above are several techniques to avoid interference with other signals by not transmitting during a certain time interval. Another technique that may be useful is to dynamically fragment data frames so as to send as much data as possible before the next interference interval. FIG. 9 illustrates an example of this technique. A transmit frame contains a header (H) and DATA. The header H may include a preamble, PHY information, MAC information, such as a network allocation vector (NAV), etc. In addition, the device that receives the DATA will respond with an acknowledgement frame (ACK). In the top timing diagram of FIG. 9, the length of the transmit frame is such that either the DATA portion and/or the ACK would extend into an interference interval that has been determined will occur at a particular time and will last for a particular time duration. This is shown in FIG. 9 by the dotted line that terminates the ACK frame during the interference interval. The process for determining when an interference interval will occur is described above and in the referenced pending patent application.

In a STA or AP, rather than wait until the interference interval starts and ends, by knowing that an interference interval will occur at a certain time and for a determined duration, the time before the interference interval can be used to transmit a part of the transmit frame. The transmit frame can be fragmented into multiple frames, such as transmit frame A and transmit frame A'. Transmit frame A' contains that portion of the DATA that could not have been sent before the interference interval, accounting for the ACK to transmit frame A. A transmit frame can be identified as having multiple fragments by setting a "more fragments" (MF) bit in a header field of the frame.

Furthermore, the NAV field in the header of the transmit frame A can be set so as to reserve sufficient time on the network for both transmit frame A and transmit frame A' and the interference interval. This allows for transmission of both fragments without having to contend for the channel. Moreover, if there are multiple interference intervals sufficiently close in time to each other, both intervals may be considered as a single interval for purposes of interference avoidance. The governing MAC protocol may limit the number of fragments that can be sent for a single data unit. There may be a minimum fragment size that is desirable to minimize the overhead.

To summarize, a method is provided for wireless communication between first and second communication devices. At the first communication device, a periodic or quasi-periodic wireless signal is detected; information is generated describing the wireless signal including a start time, duration of an interference interval during which the wireless signal is present and may interfere with signals transmitted to or from the first communication device, and period of occurrence of the wireless signal; and a message is transmitted to the second communication device containing the information describing the wireless signal. At the second communication device, the message containing the information describing the wireless signal is received from first communication device, and transmissions of signals are scheduled to the first communication device to avoid interfering with the wireless signal based on the information contained in the message.

Also provided is a processor readable medium encoded with instructions that, when executed by a processor, cause the processor to perform steps comprising receiving at a second communication device a message from a first communication device containing information describing a periodic or quasi-periodic wireless signal including a start time, duration of an interference interval during which the wireless signal is present, and period of occurrence of the wireless signal; and scheduling transmissions of signals to the first communication device during times to avoid interfering with the wireless signal detected by the first communication device based on the information contained in the message.

Similarly, a processor readable medium is provided encoded with instructions when executed by a processor, cause the processor to perform steps comprising generating information describing a periodic or quasi-periodic wireless signal including a start time, duration of an interference interval during which the wireless signal is present, and period of occurrence of the wireless signal; and generating a message to be transmitted by the first communication device to a second communication device, the message including the information describing the wireless signal.

Still further provided is a wireless communication method comprising steps of detecting a periodic or quasi-periodic wireless signal at a first communication device; and transmitting a first signal from the first communication device that will cause communication devices that receive it to defer transmissions to the first communication device for a time period corresponding to a time interval of occurrence of the wireless signal detected by the first communication device.

Yet further provided is a method for avoiding interference with a periodic or quasi-periodic wireless signal, comprising steps of detecting a periodic or quasi-periodic wireless signal at a first communication device; determining a start time, duration of an interference interval during which the wireless signal is present, and period of occurrence of the wireless signal; receiving a signal from at least one other communication device; and suppressing transmission of a response signal that should be transmitted in response to the signal received from the other communication device if the response signal would be scheduled for transmission during the interference interval of the wireless signal.

Still further provided is a method for avoiding interference with a periodic of or quasi-periodic wireless signal, comprising steps of detecting a periodic or quasi-periodic wireless signal at a first communication device; determining a start time, duration of an interference interval during which the wireless signal is present, and period of occurrence of the wireless signal; detecting a clock drift between the wireless signal and the first communication device; and scheduling transmissions by the first communication device to avoid the wireless signal, corrected for the clock drift.

Still further provided is a method for scheduling transmission of signals from a first communication device to a second communication device comprising steps of: detecting a periodic or quasi-periodic wireless signal; determining a duration of an interference interval during which the wireless signal is present and period of occurrence of the wireless signal; and dividing a frame of information to be transmitted into at least first and second sub-frames such that the first sub-frame is transmitted prior to occurrence of the interference interval and the second sub-frame is transmitted after the interference interval.

The above description is intended by way of example only.

The invention claimed is:

1. A method for wireless communication between first and second communication devices, a method comprising:
  a. at the first communication device:
    i. detecting a periodic or quasi-periodic wireless signal;
    ii. generating information describing the wireless signal including a start time, duration of an interference interval during which the wireless signal is present and may interfere with signals transmitted to or from the first communication device, and period of occurrence of the wireless signal; and
    iii. transmitting a message to the second communication device containing the information describing the wireless signal;
  b. at the second communication device:
    i. receiving the message containing the information describing the wireless signal from the first communication device; and
    ii. scheduling transmissions of signals to the first communication device to avoid interfering with the wireless signal based on the information contained in the message.

2. The method of claim 1, and further comprising, at the first communication device, steps of determining a clock drift between the wireless signal and the first communication device to allow for correction of the clock drift at the first communication device or second communication device.

3. The method of claim 2, and further comprising the step at either the first communication device or second communication device of adding a time period cushion to the beginning or end of the interference interval associated with the occurrence of the wireless signal to account for the clock drift.

4. The method of claim 3, and further comprising the step of occasionally or periodically measuring the clock drift so as to minimize the length of the time period cushion added to the interference interval associated with the occurrence of the wireless signal.

5. The method of claim 1, and further comprising, at the first communication device, steps of determining a clock drift between the first communication device and the second communication device to allow for correction of the clock drift at the first communication device or second communication device.

6. The method of claim 5, wherein the step of determining the clock drift between the first communication device and the second communication device is based on time stamp information contained in a signal transmitted by one of the first and second communication devices to the other.

7. The method of claim 1, and further comprising the step of transmitting from the first communication device to the second communication device a message informing the second communication device that the wireless signal has subsided or terminated.

8. The method of claim 1, and further comprising receiving signals from one or more other communication devices at the second communication device and transmitting signals to the one or more other communication devices from the second communication device when the wireless signal detected at the first communication device does not affect the one or more other communication devices or the second communication device.

9. The method of claim 1, and further comprising the step, at the second communication device, of transmitting a message to a plurality of other communication devices in a wireless network, the message containing the information about the wireless signal.

10. The method of claim 1, wherein at the first communication or second communication device, further comprising the step of dividing a frame of information to be transmitted into at least first and second sub-frames such that the first sub-frame is transmitted prior to the interference interval and the second sub-frame is transmitted after the interference interval.

11. The method of claim 10, and further comprising determining whether there is sufficient time remaining before the interference interval to receive an acknowledgment message from a device that received the first sub-frame, wherein the first sub-frame is transmitted prior to the interference interval if there sufficient time.

12. The method of claim 10, wherein the step of transmitting the first sub-frame comprises designating in the first sub-frame a reservation of the radio frequency channel of sufficient time to allow for the first sub-frame, the interference interval and the second sub-frame.

13. The method of claim 1, and further comprising steps of:
   a. at the first communication device, synchronizing a clock module to the wireless signal detected by the first communication device; and
   b. at the second communication device, synchronizing a clock module to the wireless signal reported by the first communication to the second communication device.

14. The method of claim 13, wherein at the first communication device, further comprising synchronizing a clock module to each periodic or quasi-periodic wireless signal detected by the first communication device.

15. The method of claim 14, wherein at the second communication device, further comprising synchronizing a clock module to each periodic or quasi-periodic wireless signal reported by the first communication device and any other communication device in the wireless network that detects a periodic or quasi-periodic wireless signal.

16. The method of claim 15, wherein at the second communication device, further comprising storing information to associate each synchronized clock module to the corresponding communication device that reported it to the second communication device.

17. The method of claim 1, wherein at the first communication device, the step of transmitting the message containing the information about the wireless signal comprises transmitting the message to a plurality of communication devices to inform them about the interference experienced by the first communication device so that the plurality of communication devices schedule transmissions to the first communication device not to coincide with the wireless signal detected by the first communication device.

18. A processor readable medium encoded with instructions that, when executed by a processor, cause the processor to perform steps comprising:
   a. generating information describing a periodic or quasi-periodic wireless signal including a start time, duration of an interference interval during which the wireless signal is present, and period of occurrence of the wireless signal; and
   b. generating a message to be transmitted by the first communication device to a second communication device, the message including the information describing the wireless signal.

19. The processor readable medium of claim 18, and further comprising instructions encoded on the medium to generate information pertaining to clock drift between the first communication device and the wireless signal and/or between the first communication device and the second communication device to allow for correction for the clock drift.

20. The processor readable medium of claim 19, and further comprising instructions encoded on the medium to generate a time period cushion to be added to the beginning and/or end of the interference interval associated with the occurrence of the wireless signal to account for the clock drift.

21. The processor readable medium of claim 20, and further comprising instructions encoded on the medium to generate a message to be transmitted by the first communication device to the second communication device that indicates that the wireless signal has terminated.

22. The processor readable medium of claim 18, and further comprising instructions encoded on the medium to generate a message for transmission to a plurality of other communication devices, the message containing the information about the wireless signal.

23. The processor readable medium of claim 18, and further comprising instructions encoded on the medium to divide a frame of information to be transmitted into at least first and second sub-frames such that the first sub-frame is transmitted prior to occurrence of the interference interval and the second sub-frame is transmitted after the interference interval.

24. The processor readable medium of claim 23, and further comprising instructions encoded on the medium for determining if there is sufficient time remaining before the interference interval to transmit the first sub-frame and receive an acknowledgment message from a device that received the first sub-frame.

25. The processor readable medium of claim 23, and further comprising instructions encoded on the medium for designating in the first sub-frame a reservation of the radio frequency channel of sufficient time to allow for the first sub-frame, the interference interval and the second sub-frame.

26. A radio communication device comprising the processor readable medium of claim 18, and further comprising a processor coupled to the processor readable medium that executes the instructions encoded thereon, a radio transceiver for transmitting and receiving radio signals and a baseband modem coupled to the processor and to the radio transceiver for generating signals containing information to be transmitted and recovering information from signals that are received by the radio transceiver.

27. The radio communication device of claim 26, and further comprising a clock module that synchronizes to each periodic or quasi-periodic wireless signal detected by the first communication device.

28. A processor readable medium encoded with instructions that, when executed by a processor, cause the processor to perform steps comprising:
  a. receiving at a second communication device a message from a first communication device containing information describing a periodic or quasi-periodic wireless signal including a start time, duration of an interference interval during which the wireless signal is present, and period of occurrence of the wireless signal; and
  b. scheduling transmissions of signals to the first communication device during times to avoid interfering with the wireless signal detected by the first communication device based on the information contained in the message.

29. The processor readable medium of claim 28, and further comprising instructions encoded on the medium to cause resumption of normal scheduling of transmissions to the first communication device in response to receiving a message from the first communication device that the wireless signal has terminated.

30. The processor readable medium of claim 28, and further comprising instructions encoded on the medium to schedule transmissions of signals with respect to the interference interval associated with the occurrence of the wireless signal to account for clock drift between the first communication device and the wireless signal and/or clock drift between the first communication device and the second communication device.

31. The processor readable medium of claim 28, and further comprising instructions encoded on the medium to divide a frame of information to be transmitted from the second communication device to the first communication into at least first and second sub-frames such that the first sub-frame is transmitted prior to occurrence of the interference interval and the second sub-frame is transmitted after the interference interval.

32. The processor readable medium of claim 31, and further comprising instructions encoded on the medium for determining if there is sufficient time remaining before the interference interval to transmit the first sub-frame to the first communication device and receive an acknowledgment message from the first communication device that it received the first sub-frame.

33. The processor readable medium of claim 31, and further comprising instructions encoded on the medium for designating in the first sub-frame a reservation of the radio frequency channel of sufficient time to allow for the transmission of first sub-frame by the second communication device, occurrence of the interference interval, and transmission of the second sub-frame by the second communication device.

34. A radio communication device comprising the processor readable medium of claim 28, and further comprising a processor coupled to the processor readable medium that executes the instructions encoded thereon, a radio transceiver for transmitting and receiving radio signals and a baseband modem coupled to the processor and to the radio transceiver for generating signals carrying information to be transmitted and recovering information from signals that are received by the radio transceiver.

35. The radio communication device of claim 34, and further comprising a clock module that synchronizes to each periodic or quasi-periodic wireless signal reported to the second communication device.

36. A wireless communication method comprising steps of:
  a. detecting a periodic or quasi-periodic wireless signal at a first communication device; and
  b. transmitting a first signal from the first communication device that will cause communication devices that receive it to defer transmissions to the first communication device for a time period corresponding to a time interval of occurrence of the wireless signal detected by the first communication device.

37. The method of claim 36, and further comprising steps at a second communication device, of:
  c. receiving the first signal from the first communication device; and
  d. transmitting a second signal intended to be received by a plurality of communication devices that informs them to defer transmissions to the first communication device for the time period corresponding to the time interval of occurrence of the wireless signal.

38. The method of claim 37, wherein the step of transmitting the first signal comprises transmitting a signal that will cause other communication devices compliant with one or more communication protocols to defer transmissions to the first communication device for a time period corresponding to the time interval of occurrence of the wireless signal.

39. The method of claim 38, wherein the step of transmitting the second signal from the second communication device comprises transmitting a signal compliant with the one or more communication protocols to defer transmissions to the first communication device for a time period corresponding to the time interval of occurrence of the wireless signal.

40. The method of claim 39, wherein the step of transmitting the first signal comprises transmitting a request-to-send (RTS) packet in accordance with an IEEE 802.11 communication protocol, and the step of transmitting the second signal comprises transmitting a clear-to-send (CTS) packet in accordance with the IEEE 802.11 communication protocol, the CTS packet including a field informing communication devices that receive it not to transmit for the time interval of occurrence of the wireless signal.

41. The method of claim 38, wherein the step of transmitting the first signal comprises transmitting a clear-to-send (CTS) packet in accordance with an IEEE 802.11 communication protocol, the CTS packet including a field informing communication devices that receive it not to transmit for the time interval of occurrence of the wireless signal.

42. The method of claim 36, and further comprising detecting clock drift between the wireless signal and the first communication device and/or clock drift between the first communication device and another communication device to allow for correction of the clock drift.

43. A method for avoiding interference with a periodic or quasi-periodic wireless signal, comprising steps of:
  a. detecting a periodic or quasi-periodic wireless signal at a first communication device;
  b. determining a start time, duration of an interference interval during which the wireless signal is present, and period of occurrence of the wireless signal;
  c. receiving a signal from at least one other communication device; and
  d. suppressing transmission of a response signal that should be transmitted in response to the signal received from the other communication device if the response signal would be scheduled for transmission during the interference interval of the wireless signal.

44. The method of claim 43, wherein the step of suppressing transmission of a response signal comprises suppressing transmission of an acknowledgment signal to a signal received from the other communication device.

45. The method of claim 43, wherein the step of suppressing transmission of a response signal comprises suppressing transmission of a signal intended to be received a plurality of communication devices that informs communication devices that receive the signal not to transmit for a time period corresponding to a requested reservation.

46. The method of claim 45, wherein the step of suppressing transmission comprises suppressing transmission of a clear-to-send (CTS) packet.

47. The method of claim 43, wherein the step of suppressing transmission further comprises correcting for a clock drift between the first communication device and the wireless signal.

48. A method for avoiding interference with a periodic of or quasi-periodic wireless signal, comprising steps of:
 a. detecting a periodic or quasi-periodic wireless signal at a first communication device;
 b. determining a start time, duration of an interference interval during which the wireless signal is present, and period of occurrence of the wireless signal;
 c. detecting a clock drift between the wireless signal and the first communication device; and
 d. scheduling transmissions by the first communication device to avoid the wireless signal, corrected for the clock drift.

49. The method of claim 48, and further comprising transmitting a signal to a second communication device that allows the second communication device to schedule transmissions to the first communication device so as to avoid the wireless signal.

50. The method of claim 49, and further comprising steps of detecting a clock drift between the first communication device and a second communication device to allow for correction for the clock drift by the first communication device or the second communication device.

51. The method of claim 48, and further comprising the step of occasionally or periodically measuring the clock drift so as to minimize a length of a time period cushion added to the interference interval associated with the occurrence of the wireless signal.

52. A method for scheduling transmission of signals from a first communication device to a second communication device comprising steps of:
 a. detecting a periodic or quasi-periodic wireless signal;
 b. determining a duration of an interference interval during which the wireless signal is present and period of occurrence of the wireless signal; and
 c. dividing a frame of information to be transmitted into at least first and second sub-frames such that the first sub-frame is transmitted prior to occurrence of the interference interval and the second sub-frame is transmitted after the interference interval.

53. The method of claim 52, and further comprising determining whether there is sufficient time remaining before the interference interval to receive an acknowledgment message from a device that received the first sub-frame, wherein the first sub-frame is transmitted and the acknowledgment message is received prior to the interference interval.

54. The method of claim 52, and further comprising detecting a clock drift between the first communication and the wireless signal to correct for the clock drift in scheduling transmissions from the first communication device.

* * * * *